Patented June 1, 1943

2,320,817

UNITED STATES PATENT OFFICE 2,320,817

POLYSALICYLIDE-MODIFIED AMINOPLAST

Gaetano F. D'Alelio, Pittsfield, Mass., assignor to General Electric Company, a corporation of New York No Drawing. Application October 26, 1940,
Serial No. 363,036

17 Claims. (Cl. 260—70)

This invention relates broadly to resinous compositions. More particularly it is concerned with a novel method of converting soluble, fusible aminoplasts to the insoluble, infusible state. Specifically the invention is concerned with the production of new and useful compositions of matter comprising an aminoplast modified with a polysalicylide, examples of which are disalicylide,

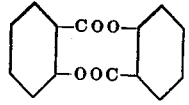

tetrasalicylide,

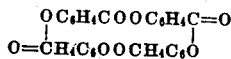

or, in general, a polysalicylide having the formula $(C_7H_4O_2)_n$, where $n$ is an integer and is at least 2, e. g., 6 to 20 or more.

I have discovered that when a polysalicylide is incorporated into a normally non-curing but potentially heat-curable aminoplast it functions to accelerate the curing of the aminoplast at molding temperatures to an insoluble, infusible state. This is quite surprising and unexpected, especially in view of the fact that polysalicylides are neutral esters and it would not be expected that such bodies, being neutral, would function as an accelerator of curing of aminoplasts. I have further found that the polysalicylides are compatible with aminoplasts and improve their plasticity. Furthermore, potentially reactive aminoplasts which have been modified with a polysalicylide have good time or storage stability. This is a matter of considerable practical importance, since the heat-curable aminoplasts or molding compositions made therefrom then can be molded without difficulty regardless of the period of storage and still obtain molded articles of uniform characteristics.

As is well known, aminoplasts are synthetic resins derived from amino (including imino) or amido (including imido) compounds, a typical example being urea-formaldehyde resin (reference: Modern Plastics, vol. 17, No. 2, October, 1939, page 433; Patent 2,214,851, D'Alelio). In the production of aminoplasts it has heretofore been common practice in converting such materials to an insoluble, infusible state to incorporate into the condensation product or into the molding composition a latent or an active (direct) curing catalyst. These prior heat-convertible aminoplasts, more particularly those containing direct or active curing catalysts such as acids, for example hydrochloric, ethyl sulfuric, phthalic, chloracetic, phosphoric, etc., lacked time or storage stability. This necessitated early use of the material after incorporating the catalyst. These and other difficulties in producing stable, rapidly curing aminoplasts with curing catalysts such as were known prior to my invention are obviated by modifying the aminoplast with a polysalicylide.

In producing the aminoplast the choice of the aldehyde component is dependent largely upon economic considerations and upon the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes.

The amido, imido, amino or imino component may be, for instance, urea, thiourea, diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylene urea, methylol ureas, guanidine, dicyandiamide, guanyl urea, guanyl thiourea, biguanidine, aminotriazines, aminodiazoles, creatinine, guanoline, etc. In many cases the use of an aminotriazine, e. g., melamine, alone or in conjunction with other amido, amino, imido or imino compounds, is particularly advantageous. Illustrative examples of aminotriazines are triazines containing at least one amino group, e. g., melamine, ammeline, ammelide, formoguanamine, 2-amino-1,3,5-triazine, melam, melem, melon, 2,4,6-triethyltriamino-1,3,5-triazines, 2,4,6-triphenyltriamino-1,3,5-triazines, etc. Nuclearly substituted aminotriazines also may be used, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxyl-1,3,5-triazines (for example, 2-methyl-4-amino-6-hydroxy-1,3,5-triazine, etc.), 2-aryl-4-amino-6-hydroxy-1,3,5-triazines (for example, 2-phenyl-4-amino-6-hydroxy-1,3,5-triazines, etc.), and the like. Suitable mixtures of aminotriazines may be employed. Also, suitable mixtures of, for example, amino compounds, imino compounds, amido compounds, or imido compounds, or amino and amido compounds, imino and amido compounds, imido and amido compounds, imino and amino compounds, etc., such as above mentioned by way of illustration, may be employed. All of these compounds are aldehyde-reactable organic compounds and all contain at least one reactive amino, amido, imino or imido group. The term "amidogen compound" as used generally herein is intended to include within its meaning organic compounds containing at least one active

group.

In producing the condensation product of ingredients comprising an amidogen compound and an aldehyde, the initial condensation may be carried out at normal or at elevated temperatures and in the presence or absence of an acid or alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkali such as sodium, potassium and calcium hydroxides, sodium and potassium carbonates, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines (e. g., ethyl amine, propyl amine, etc.) and secondary amines, (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

In order that those skilled in the art better may understand how the present invention may be carried into effect, the following illustrative examples thereof are given. All parts are by weight.

*Example 1*

|  | Parts |
| --- | --- |
| Melamine | 315.0 |
| Urea | 150.0 |
| Aqueous solution of formaldehyde (approximately 37.1% HCHO) | 1000.0 |
| Aqueous ammonia (28% NH₃) | 30.0 |
| Sodium hydroxide in 30 parts water | 0.6 |
| Polysalicylide | 19.0 |

All of the above components with the exception of the polysalicylide were mixed and heated for 15 minutes at the boiling temperature of the mass under reflux. The hot resinous syrup was mixed with the stated amount of polysalicylide, 475 parts alpha cellulose in flock form and 4 parts of a mold lubricant, specifically zinc stearate. The wet compound was dried for 1½ hours at 75° C., after which it was molded for 2 minutes at 130° C. under a pressure of 2000 pounds per square inch. The molded articles were well cured throughout and had excellent surface finish and water resistance. When the polysalicylide is omitted from the above formulation, uncured articles that readily disintegrate in water are obtained.

*Example 2*

|  | Parts |
| --- | --- |
| Melamine | 315.0 |
| Thiourea | 190.0 |
| Aqueous solution of formaldehyde (approximately 37.1% HCHO) | 1000.0 |
| Aqueous ammonia (28% NH₃) | 30.0 |
| Sodium hydroxide in 30 parts water | 0.6 |
| Polysalicylide | 19.5 |

The same procedure was followed in making the resin syrup as described under Example 1. The hot syrup was mixed with the stated amount of polysalicylide, 490 parts alpha cellulose in flock form and 4 parts zinc stearate. The wet compound was dried for 2¾ hours at 75° C. The dried compound was molded for 2 minutes at 130° C. under a pressure of 2000 pounds per square inch, yielding well-cured molded articles.

*Example 3*

|  | Parts |
| --- | --- |
| Melamine | 472.5 |
| Dicyandiamide | 105.0 |
| Aqueous solution of formaldehyde (approximately 37.1% HCHO) | 1200.0 |
| Aqueous ammonia (28% NH₃) | 30.0 |
| Sodium hydroxide in 30 parts water | 0.48 |
| Polysalicylide | 20.4 |

The same procedure was followed in making the resin syrup as described under Example 1. The hot syrup was mixed with the stated amount of polysalicylide, 610 parts alpha cellulose in flock form and 4 parts zinc stearate to form a molding (moldable) compound. The wet compound was air dried at room temperature. The dried compound was molded for 5 minutes at 140° C. under a pressure of 2000 pounds per square inch, yielding well-cured molded pieces.

*Example 4*

|  | Parts |
| --- | --- |
| Melamine | 252.0 |
| Aqueous solution of formaldehyde (approximately 37.1% HCHO) | 560.0 |
| Aqueous ammonia (28% NH₃) | 12.0 |
| Sodium hydroxide in 120° parts water | 0.48 |
| Polysalicylide | 10.0 |

All of the above components with the exception of the polysalicylide were mixed and heated under reflux for 10 minutes. The resulting resin syrup was mixed with the stated amount of polysalicylide, 267 parts alpha cellulose in flock form and 1 part zinc stearate. The wet compound was dried for 4 hours at 67° C. The dried compound was molded for 3 minutes at 130° C. under a pressure of 2000 pounds per square inch. The molded pieces could be pulled hot from the mold without distortion. They were well cured throughout and had a very good color.

Although polysalicylides provide an accelerated cure of condensation products of, for example, urea and formaldehyde, thiourea and formaldehyde, etc., to an insoluble and infusible state, I have surprisingly found that when an aminotriazine, specifically melamine, is one of the starting reactants, then for some unexplainable reason even better acceleration of cure is obtained. The aminotriazine may constitute the sole reactant containing an active

group or it may be used in conjunction with urea or the like without materially lessening the improvement obtained. For optimum results in the curing of such mixed or co-condensation products with a polysalicylide, the amount of the aminotriazine should be at least 25 mol per cent of the molar amount of urea, thiourea, dicyandiamide or other material which when condensed with an aldehyde, e. g., formaldehyde, in the absence of an aminotriazine yields a more slowly curing, soluble, fusible condensation product. Preferably I use at least 0.4 mol of the aminotriazine, specifically melamine, for each mol of urea or equivalent material. Obviously higher amounts may be employed, for example from equimolecular proportions of aminotriazine and urea or its equivalent to from 10 to 100 mols of the aminotriazine for each mol of urea or equivalent material.

Although in the foregoing examples I have shown the polysalicylide as being incorporated into the resinous mass at the same time the resin syrup is being compounded with a filler and a mold lubricant, I am not limited to this specific procedure. For example, the polysalicylide may be added to the reaction vessel along with the other reactants and all the components heated together from the beginning to effect reaction therebetween. Or, all the components with the exception of the polysalicylide may be heated together for a short time under reflux, the polysalicylide added to the partial condensation product thereby obtained, and the resulting mass heated for an additional period of time under reflux prior to incorporating a filler therewith. Or, the polysalicylide may be mixed with the components (fillers, plasticizers, mold lubricants, etc.) of the molding composition at any convenient stage in the preparation of such compositions.

The amount of polysalicylide which is incorporated into the resin or into the molding composition may vary widely, depending largely upon the particular curing rates desired. In general, however, only a relatively small amount of polysalicylide is used and, preferably, not exceeding substantially 0.1 mol of polysalicylide per mol of amidogen compound. As little as 0.001 mol of polysalicylide per mol of amidogen compound may be employed when less accelerated curing rates are desired.

The initial condensation reaction between the aldehyde and the amidogen compound may be carried out under acid, neutral or alkaline conditions, at atmospheric, sub-atmospheric or super-atmospheric pressure, and in the presence or absence of a solvent for the initial condensation product. I prefer to form the initial condensation product by causing an amidogen compound and an aldehyde to react while admixed with a primary condensation catalyst and a secondary condensation such as hereinbefore described, specifically a condensation catalyst comprising ammonia and a fixed alkali, e. g., sodium hydroxide. Various mol ratios of reactants may be employed as desired or as conditions may require, but the proportions usually are within the range of 1 mol amidogen compound to from 1 to 6 or 7 mols of aldehyde, specifically formaldehyde. For example, in producing a potentially reactive urea-formaldehyde or melamine-formaldehyde condensation product, I advantageously may use from 1 mol urea (or melamine) to from 1½ to 3¼ mols formaldehyde.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acryloamide, benzamide, toluene sulfonamide, benzene disulfonamide, benzene trisulfonamide, adipic diamide, phthalamide, etc.; amines such as ethylene diamine, aniline, phenylene diamine, etc.; phenols; aminophenols; ketones; etc.

The modifying bodies also may take the form of high molecular weight bodies with or without resinous characteristics, for example hydrolyzed wood products, formalized cellulose derivatives, lignin, proteins, protein-aldehyde condensation products, furfural condensation products, phenol-aldehyde condensation products, aniline-aldehyde condensation products, modified or unmodified, saturated or unsaturated polyhydric alcohol-polybasic acid condensation products, sulfonamide-aldehyde resins, water-soluble cellulose derivatives, natural gums and resins such as copal, shellac, etc.; polyvinyl compounds such as polyvinyl alcohol, polyvinyl acetate, polyvinyl acetals, specifically polyvinyl formal, etc.

Dyes, pigments, plasticizers, mold lubricants, opacifiers and various fillers (e. g., wood flour, glass fibers, asbestos including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C. For optimum results I prefer to use temperatures ranging from approximately 120° to 180° C. Molding pressures may be varied considerably, but usually are within the range of 1000 to 10,000 pounds per square inch, more particularly from 2000 to 4000 or 5000 pounds per square inch.

From the foregoing description it will be seen that the present invention provides new and useful compositions of matter comprising heat-curable and heat-cured aminoplasts modified with a polysalicylide. The scope of the invention includes products comprising an aminoplast cured to an insoluble and infusible state with a polysalicylide. The invention also provides resinous compositions comprising a soluble, fusible aminoplast containing a polysalicylide as an accelerator of curing; also, compositions of matter comprising a normally non-curing but potentially heat-curable, alcohol-modified aminoplast having incorporated therein a polysalicylide as a curing accelerator. Other specific embodiments of the invention include heat-curable compositions comprising (1) a polysalicylide and (2) a potentially reactive condensation product of a mixture comprising urea and formaldehyde, or an aminotriazine, e. g., melamine, and formaldehyde, or urea, an aminotriazine and formaldehyde, including the products obtained by curing such heat-curable compositions. A polysalicylide-modified reaction product of ingredients comprising melamine and formaldehyde also is provided by this invention. By carrying my invention into effect heat-hardenable molding compositions comprising a filler, a polysalicylide and a soluble, fusible aminoplast can be produced, as well as articles of manufacture comprising such heat-hardened articles. A specific method feature of the invention is the method of curing a composition comprising a soluble, fusible (potentially heat-curable) aminoplast which comprises incorporating therein a small amount of a polysalicylide and subjecting the resulting composition to a temperature of the order of 100° to 200° C. until the composition has cured.

The modified or unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the manufacture of arc-extinguishing tubes capable of evolving an arc-extinguishing gas under the heat of the arc, in the production of wire or baking enamels, and for bonding or cementing together mica flakes to form a laminated mica article. They also may be used as fire retardants and sizings, for example in the treatment of cotton, linen and other cellulosic materials. They also may be used as impregnants for electrical coils. The cured products have excellent resistance to heat and water and have a high dielectric strength. Products of outstanding heat, water and arc resistance are obtained when an aminotriazine constitutes one of the reactants.

What I claim as new and desire to secure by Letters Patent of the United States is:

1. A composition of matter comprising a reaction product of ingredients comprising an amidogen compound and an aldehyde, said reaction product being modified with a polysalicylide.

2. A composition of matter comprising a potentially heat-curable aminoplast and a small amount of a polysalicylide incorporated in the said aminoplast as an accelerator of curing thereof.

3. A product comprising a potentially heat-curable aminoplast which has been cured to an insoluble and infusible state with a polysalicylide.

4. A resinous composition comprising a potentially heat-curable reaction product of ingredients comprising an amidogen compound and an aldehyde, said reaction product having incorporated therein a polysalicylide as an accelerator of curing.

5. A composition of matter comprising an alcohol-modified, potentially heat-curable aminoplast having incorporated therein a polysalicylide as an accelerator of curing.

6. A heat-curable composition comprising (1) a polysalicylide and (2) a potentially reactive condensation product of a mixture comprising urea and formaldehyde.

7. A product comprising the cured composition of claim 6.

8. A heat-curable composition comprising (1) a polysalicylide and (2) a potentially reactive condensation product of a mixture comprising an aminotriazine and formaldehyde.

9. A product comprising the cured composition of claim 8.

10. The polysalicylide-modified reaction product of ingredients comprising melamine and formaldehyde.

11. A heat-curable composition comprising (1) a polysalicylide and (2) a potentially reactive condensation product of a mixture comprising urea, an aminotriazine and formaldehyde.

12. A product comprising the cured composition of claim 11.

13. A heat-hardenable molding composition comprising a filler, a polysalicylide and a potentially heat-curable aminoplast.

14. An article of manufacture comprising the heat-hardened molding composition of claim 13.

15. The method of curing a composition comprising a potentially heat-curable aminoplast which comprises incorporating therein a small amount of a polysalicylide and subjecting the resulting composition to a temperature of the order of 100° to 200° C. until the composition has cured.

16. A composition comprising a potentially heat-curable reaction product of an amidogen compound and formaldehyde, said reaction product having incorporated therein a curing accelerator comprising a polysalicylide in an amount corresponding to from 0.001 to 0.1 mol of polysalicylide per mol of the said amidogen compound.

17. The polysalicylide-modified reaction product of ingredients comprising urea, melamine and formaldehyde, the melamine component constituting at least 25 mol per cent of the molar amount of urea, and the formaldehyde component being present in an amount corresponding to from 1 to 7 mols formaldehyde per mol of the total urea and melamine components, said polysalicylide-modified reaction product being heat-convertible within the temperature range of 100° to 200° C. to a cured state.

GAETANO F. D'ALELIO.

CERTIFICATE OF CORRECTION.

Patent No. 2,320,817. June 1, 1943.

GAETANO F. D'ALELIO.

It is hereby certified that error appears in the printed specification of the above numbered patent requiring correction as follows: Page 2, second column, line 29, Example 3, for "0.48" read --0.6--; line 49, Example 4, for "120°" read --120--; page 3, second column, line 7, for "acryloamide" read --acrylamide--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.